United States Patent [19]

Daikoku et al.

[11] Patent Number: 4,803,739
[45] Date of Patent: Feb. 7, 1989

[54] SSB COMMUNICATION SYSTEM

[75] Inventors: Kazuhiro Daikoku; Shigeaki Ogose, both of Tokyo, Japan

[73] Assignee: Nippon Telegraph and Telegraph Corporation, Tokyo, Japan

[21] Appl. No.: 806,991

[22] Filed: Dec. 9, 1985

[30] Foreign Application Priority Data

| Dec. 10, 1984 | [JP] | Japan | 59-259354 |
| Jan. 28, 1985 | [JP] | Japan | 60-12618 |
| Feb. 12, 1985 | [JP] | Japan | 60-23646 |
| Apr. 19, 1985 | [JP] | Japan | 60-82530 |
| Apr. 19, 1985 | [JP] | Japan | 60-82531 |
| May 23, 1985 | [JP] | Japan | 60-109438 |
| May 31, 1985 | [JP] | Japan | 60-116528 |
| Jun. 21, 1985 | [JP] | Japan | 60-134213 |
| Jun. 24, 1985 | [JP] | Japan | 60-136095 |
| Oct. 24, 1985 | [JP] | Japan | 60-236449 |

[51] Int. Cl.[4] .......................... H04B 1/68; H03C 1/52
[52] U.S. Cl. ........................................ 455/47; 455/63; 375/43
[58] Field of Search ................. 455/47, 109, 203, 63, 455/72, 304, 305, 67, 10, 52, 275-278; 375/43, 77, 42, 60, 61

[56] References Cited

U.S. PATENT DOCUMENTS

| 2,717,956 | 9/1955 | Eglin | 455/47 |
| 2,874,222 | 2/1959 | DeJager | 455/47 |
| 2,989,622 | 6/1961 | Doherty | 455/47 |
| 3,508,155 | 4/1970 | Voelcker, Jr. | 375/77 |
| 3,800,131 | 3/1974 | White | 455/47 |
| 3,984,778 | 10/1976 | Bhopale | 455/202 |
| 4,064,361 | 12/1977 | Kustka et al. | 375/42 |
| 4,262,360 | 4/1981 | Bigo et al. | 375/77 |
| 4,525,862 | 6/1985 | Parker | 455/47 |
| 4,561,111 | 12/1985 | Conner | 455/47 |

Primary Examiner—Robert L. Griffin
Assistant Examiner—Curtis Kuntz
Attorney, Agent, or Firm—Armstrong, Nikaido, Marmelstein & Kubovcik

[57] ABSTRACT

A SSB (single sideband) single accompanied by a carrier component is demodulated by the following process: If the carrier level in receiving signals is lower than the SSB signal's, the carrier must be amplified up to the level which is higher than that of the SSB signal. Amplitude variations of SSB signals are completely removed by an amplitude limiter. The output of the amplitude limiter is demodulated by a frequency detector and an equalizer which makes the frequency response flat. A linearizer is employed for demodulated signals to eliminate higher order distortions of the signal. The linearizer may be omitted when a pre-distortion circuit is introduced in a transmitter of the system.

9 Claims, 4 Drawing Sheets

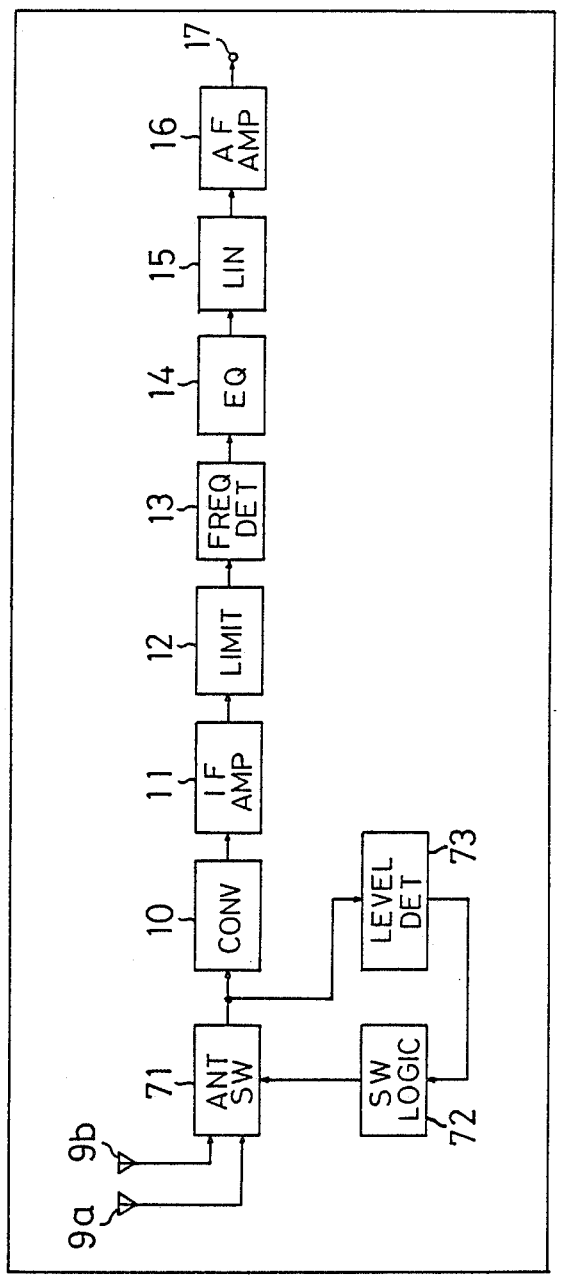

SSB COMMUNICATION SYSTEM

BACKGROUND OF THE INVENTION

1. Field of the Invention

The present invention relates to an SSB (single sideband) communication system. More specifically, this invention relates to apparatus and methods for a demodulating process of SSB signals where a frequency detector and amplitude limiter can be employed.

It is desirable when communicating with radios that degradations caused by multi-path fading are completely removed. Therefore, modulation methods which can counter the effects of fading must be used. The immediate solution would be to use some form of angle modulation such as FM (frequency modulation) or PM (phase modulation). However, the necessary FM transmission bandwidth of B is approximately twice the sum of the peak frequency deviation of $\Delta F$ and the highest modulating frequency of $f_m$, that is, $B=2(\Delta F+f_m)$. This relation is called Carson's rule, and indicates that the FM transmission bandwidth is much wider than the information itself. Even if the frequency deviation is limited to zero, the necessary FM bandwidth is twice as large as the information bandwidth, namely, $2f_m$.

Using SSB modulation, voice signals can be inherently transmitted in a bandwidth comparable to the information bandwidth. Therefore, an SSB modulation method is very useful from the view-point of a considerable saving of the bandwidth. However, is SSB, the information is contained in the signal envelope. For the purpose of maintaining the high quality of demodulated voice signals, an AGC (automatic gain control) circuit fast enought to follow fading must be provided. Also, the carrier must be regenerated in order to demodulate the SSB signal. Carrier recovery is a cumbersome operation for mobile radios.

2. Description of the Prior Art

There are a lot of transmitters which employ an SSB modulation method, however, SSB signals cannot be demodulate without using a carrier regenerated in a receiver. Also SSB signals cannot remove amplitude variations with an amplitude limiter. In the technical paper entitled "Information in the zero crossings of bandpass signals", Bell System Technical Journal, vol. 56, no. 4, p.p. 487-510, April 1977, the author of the paper, B. F. Logan pointed out that the signal can be reconstructed after amplitude limiting if the signal is expressed by only real simple zeros and that a full-carrier SSB signal belongs to the signal expressed by only real simple zeros.

SUMMARY OF THE INVENTION

The present invention substantially obviates one or more of the limitations and disadvantages of the described prior communication systems.

A basic object, feature and advantage of the invention is to provide an SSB communication system whose necessary radio frequency bandwidth is comparable to the information bandwidth and in which an amplitude limiter in the receiver portion of the system can be safely used to remove amplitude degradations caused by fading. Besides removing amplitude degradations, this invention provides for demodulating SSB signals by the use of a frequency detector and an equalizer. Another object of the invention is that it provides a means for linearizing the higher order distortions contained in the detected signal.

BRIEF DESCRIPTION OF THE DRAWINGS

These, and other objects, features, characteristics and advantages of the systems and signal development techniques of the invention will be apparent from the following description of certain typical forms thereof, taken together with the accompanying drawings:

FIG. 7 is a block diagram of diversity reception circuit of SSB communication system.

DESCRIPTION OF PREFERRED EMBODIMENTS

Figure 1:
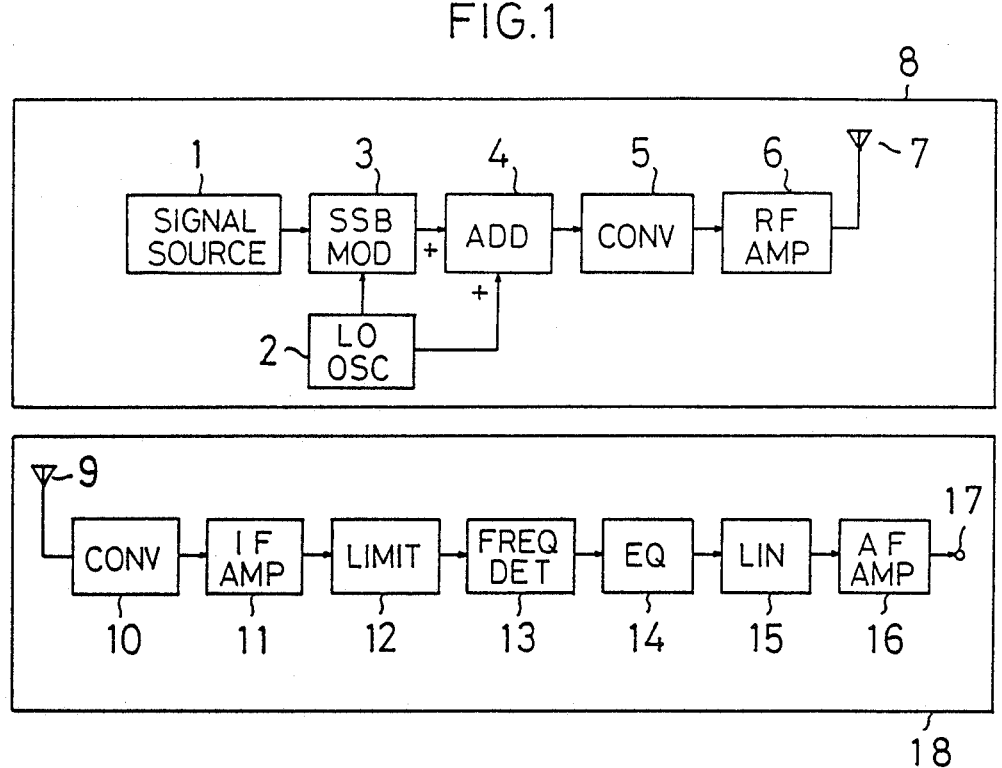
FIG. 1 is a block diagram of SSB communication system.

The principle of the present invention is based upon the fact that signals expressed only in real simple zeros can be fed into an amplitude limiter. When an SSB signal modulated by a band-limited baseband signal is accompanied by a carrier, whose level is higher than that of the SSB signal, this SSB signal is called a full-carrier SSB.

The theoretical analysis of the present invention is first presented. A full carrier SSB signal can be expressed, $$S(t)=(1+mg(t)) \cos \omega_c t + m\hat{g}(t) \sin \omega_c t, \qquad (1)$$

where m is a modulation index and g(t) is a real information signal extending the frequency range, for instance, of between 300 Hz and 3.0 kHz. $\hat{g}(t)$ ($=H(g(t))$) is a Hilbert transform of g(t). $\omega_c$ ($=2\pi f_c$) is the angular frequency of a sinusoidal carrier signal. Equation (1) can be rearranged as, $$S(t)=A \cos \theta(t),$$

where $$\theta(t)=\omega_c t - \omega(t)$$

$$\omega(t)=\arctan \{m\hat{g}(t)/(1°mg(t))\}$$

$$A = \sqrt{(1 + mg(t))^2 + (m\hat{g}(t))^2}.$$

When both m and g(t) are constrained such that $$0 < m \leq 1 \text{ and } -1 \leq g(t) \leq 1,$$

S(t) can be expressed only in real simple zeros. Therefore, S(t) can be safely applied to the amplitude limiter.

Following amplitude limiting in the receiver, a frequency detector (frequency discriminator) performs the operation, $$v(t) = \theta'(t)/2\pi - f_c$$
$$= -\omega'(t)/2\pi.$$

Then, $$\begin{aligned}\omega'(t) &= (d/dt)\{\arctan(m\hat{g}(t)/(1 + mg(t)))\} \\ &= \{m\hat{g}'(t) + m^2(g(t)\hat{g}(t) - g(t)\hat{g}'(t))\}/\{1 + 2mg(t) + m^2(g^2(t) + \hat{g}^2(t))\} \\ &= m\hat{g}'(t) - m^2(\hat{g}(t)g(t) + \hat{g}(t)g'(t)) + m^3(\hat{g}'(t)g^2(t) - \hat{g}'(t)\hat{g}^2(t) + 2g(t)g'(t)\hat{g}(t)) + O(m^4) \\ &= m\hat{g}'(t) - m^2(g(t)\hat{g}(t))' + m^3\{(g^2(t)\hat{g}(t))' - (\hat{g}^3(t))'/3\} + O(m^4),\end{aligned} \quad (2)$$

where the prime symbol implies differentiation.

In a frequency response equalization process, an integrator is used, the output of the same is given as, $$v_1(t) = m\hat{g}(t) - m^2\hat{g}(t)g(t) + m^3(g^2(t)\hat{g}(t) - \hat{g}^3(t)/3) + O(m^4). \quad (3)$$

When the constant can be omitted without the loss of generality, the first term on the right hand side of Eq. (3) corresponds to the information signal. Other terms are the higher order products of g(t), which should be cancelled out by the use of a linearizer circuit.

The relation between the integrator and −6 dB/octave response equalizer will be clarified as follows:

It is possible to compensate the frequency response with a −6 dB/octave response equalizer, whose function can be explained mathematically, $$g'(t) = -2/\pi \hat{g}(t) \text{ and } \hat{g}'(t) = 2\pi g(t),$$

which can be easily reduced by using the relation between the differentiation of sinusoidal functions and Hilbert transforms, because g(t) is Fourier transformable. Thus, the demodulated signal is equalized as, $$v_2(t) = mg(t) - m^2(g^2(t) - \hat{g}^2(t))/2 + m^3(g^3(t) - 3g(t)\hat{g}^2(t))/3 + O(m^4). \quad (4)$$

The Hilbert transform of $v_1(t)$ can be written as, $$\begin{aligned}\hat{v}_1(t) &= -mg(t) + m^2(g^2(t) - \hat{g}^2(t))/2 + m^3(g(t)\hat{g}^2(t) - g^3(t)) + O(m^4) \\ &= -v_2(t),\end{aligned} \quad (5)$$

which corresponds to Eq. (4) except for the coefficient of −1. Here, the following relations are utilized, $$H(\hat{g}(t)) = -g(t)$$

$$H(g(t)\hat{g}(t)) = -(g^2(t) - \hat{g}^2(t))/2$$

$$H(\hat{g}^3(t) - 3g^2(t)\hat{g}(t)) = g^3(t) - 3g(t)\hat{g}^2(t).$$

Next, the following equation is useful for explaining how to fabricate a linearizer by using the existent devices, that is, $$u(t) = v_1(t) - v_1(t)\hat{v}_1(t) + v_1(t)\hat{v}_1^2(t)/2 - v_1^3(t)/6. \quad (6)$$

Substituting Eqs. (3) and (5) into Eq. (6), the right hand side of Eq. (6) becomes, $$u(t) = m\hat{g}(t) + O(m^4). \quad (7)$$

which indicates that the second and third order products of g(t) are completely deleted.

The Hilbert transform of u(t) is given as $$\hat{u}(t) = -mg(t) + O(m^4).$$

Since the human ear cannot distinguish between g(t) and ĝ(t), the Hilbert transformer after being linearizer is not necessary when voice signals are applied. However, when data signals like MODEM signals, are applied, the Hilbert transformer is necessary to prevent generating distortion. This is because the different between g(t) and ĝ(t) is apparent for data signals.

FIG. 1 shows a block diagram of the present invention. In this figure, the reference numerical 1 is a signal source, 2 is a local oscillator, 3 is an SSB modulator, 4 is an adder, 5 is an up-converter for converting the frequency of the output of adder 4 to radio frequency, 6 is an RF (radio frequency) amplifier, 7 is a transmitting antenna, and 8 indicates a transmitter portion of the system.

Further, the numerical 9 is a receiving antenna, 10 is a down-converter for converting the frequency from RF to IF (intermediate frequency), 11 is an IF amplifier, 12 is an amplitude limiter for removing amplitude variations of receiving SSB signal, 13 is a frequency detector, 14 is a frequency response equalizer, 15 is a linearizer for cancelling distortions contained in the demodulated signal, 16 is an AF (audio frequency) amplifier, 17 is an output terminal, and 18 is a receiver portion of the system.

In transmitter portion 8 of the system, voice signals in the frequency range, for example, of from 300 Hz to 3.0 kHz is provided from signal source 1. Then, voice signals are fed to SSB modulator 3 which is also fed with IF wave produced in local oscillator 2. Thus, a single sideband suppressed carrier signal is generated at the output of SSB modulator 3 by using, for example, the phasing method.

The output of SSB modulator 3 is fed to adder 4, where it is combined with the carrier (the signal of local oscillator 2). The output of adder 4 feeds up-converter 5 which converts the frequency to RF region. RF amplifier 6 amplifies the RF signal which is radiated in the air through transmitting antenna 7.

In receiver portion 18 of the system, the signal recieved by receiving antenna 9 feeds down-converter 10, which converts the frequency from RF to IF. Then, in order to compensate the radio transmission path loss, the IF signal is amplified in IF amplifier 11 up to the level where the demodulation process can be performed. The output of IF amplifier 11 feeds amplitude limiter 12 which removes amplitude variations due to fading. If the level of receiving carrier is lower than that of the SSB signal, the carrier component must be amplified to satisfy the condition of a full carrier SSB signal before the signal is applied to the amplitude limiter 12. The output of the amplitude limiter 12 is applied to the frequency detector 13 to provide demodulated voice signals which in turn feed equalizer 14 to compensate the frequency response of interesting bandwidth. There are two possible ways for compensation, that is, (a) an integrator and (b) −6 dB/octave response equalizer.

The output of equalizer 14 is fed to linearizer 15 in order to cancel out distortions generated in a demodulation process. The output of linearizer 15 is fed through AF amplifier 16 to output terminal 16.

Figure 2:
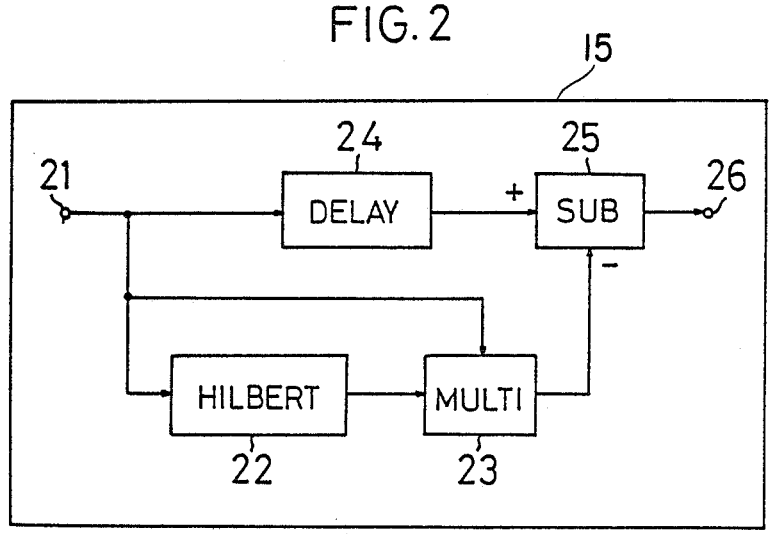
FIG. 2 is a block diagram of linearizer 15 which is used with an integrator depicted in FIG. 1.

FIG. 2 shows a block diagram of linearizer 15, when frequency detector 13 and integrator are employed. In this figure, the reference numerical 21 is an input terminal, 22 is a Hilbert transformer, 23 is multiplier, 24 is a delay circuit, 25 is a subtractor, and 26 is an output terminal.

Equation (3) is useful how to cancel out the second order product of g(t). An apparatus for compensating the second order product of g(t) is depicted in FIG. 2. In this figure, input terminal 21 is connected to the output of frequency detector 13. The signal at input terminal 21 which feeds Hilbert transformer 22 is denoted $m\hat{g}(t) - m^2 g(t)\hat{g}(t) + O(m^3)$. The output of Hilbert transformer 22 is multiplied with the signal derived from input terminal 21 so that the second order product of $-m^2 g(t)\hat{g}(t) + O(m^3)$ is obtained at the output of the multiplier 23. The signals at the output of the delay circuit 24 and the multiplier 23 are applied to subtractor 25 to delete the second order product of g(t). Delay circuit 24 can then be adjusted so that the distortion at output terminal 26 is a minimum. This procedure can be performed, for example, by using a spectrum analyzer.

Figure 3:
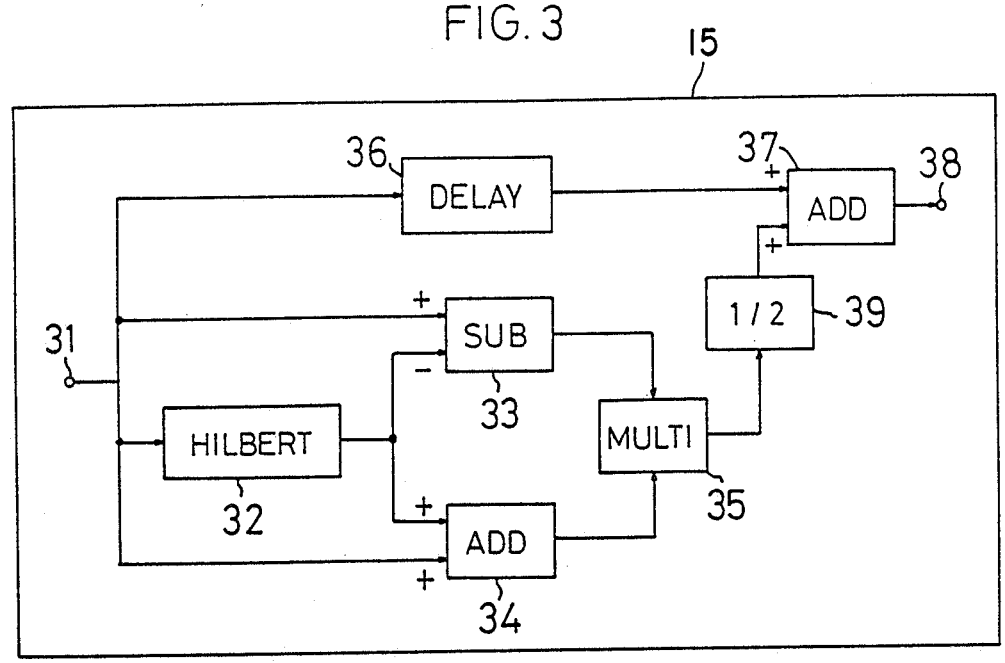
FIG. 3 is a block diagram of another embodiment of linearizer 15 depicted in FIG. 1 which is used with a $-6$ dB/octave response equalizer.

FIG. 3 shows another embodiment of the linearizer 15 according to the present invention. In this figure, the reference numerical 31 is an input terminal, 32 is a Hilbert transformer, 33 is a subtractor, 34 is an adder, 35 is a multiplier, 36 is a delay circuit, 37 is an adder, 38 is an output terminal and 39 is an attenuator for halving the signal level.

The embodiment depicted in FIG. 3 is applicable when frequency detector 13 is accompanied by −6 dB/octave response equalizer. The operation of the linearizer is governed by Eq. (4).

The signal at input terminal 31, which is the output of frequency equalizer 14, is applied to Hilbert transformer 32, subtractor 33, adder 34 and delay circuit 36. The output of the Hilbert transformer 32 is applied to subtractor 33 and adder 34. The product signal which is derived from multiplier 35 is $m^2(g(t) - \hat{g}(t))(g(t) + \hat{g}(t)) + O(m^3)$. This signal is fed through attenuator 39 to adder 37 where it is combined with the output of the delay circuit 36. The delay time should be adjusted in order to cancel out the second order product of g(t). Delay circuit 36 is useful to compensate for the total delay time arisen from Hilbert transformer 32, subtractor 33, adder 34 and multiplier 35. Then, the signal at the output of adder 37 is $mg(t) + O(m^3)$ which is free from the second order product of g(t).

Figure 4:
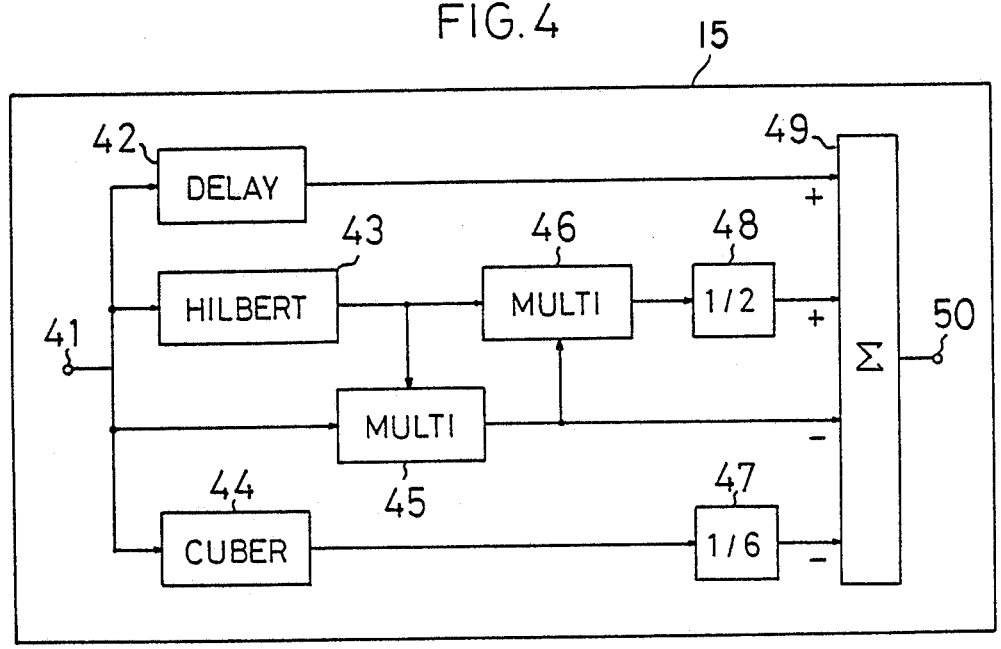
FIG. 4 is a block diagram of still another embodiment of linearizer 15 depicted in FIG. 1.

FIG. 4 shows another embodiment of the linearizer 15. In this figure, the reference numerical 41 is an input terminal, 42 is a delay circuit, 43 is a Hilbert transformer, 44 is a cuber, 45 and 46 are multipliers, 47 and 48 are attenuators, 49 is a summation circuit and 50 is an output terminal.

The signal at the input terminal 41, which is the output of frequency detector 13, is denoted $v_1(t)$ as formulated in Eq. (3). The input signal is distributed to delay circuit 42, Hilbert transformer 43, cuber 44 and multiplier 45. The output of Hilbert transformer is then $\hat{v}_1(t)$ which feeds multipliers 45 and 46. The signals at the output of multipliers 45 and 46 are $v_1(t)\hat{v}_1(t)$ and $v_1(t)\hat{v}_1^2(t)$, respectively. The output of multiplier 46 is connected to attenuator 48 whose attenuation factor is $\frac{1}{2}$. Cuber 44 cubes $v_1(t)$ which feeds attenuator 47 whose attenuation factor is 1/6. The signals derived from delay circuit 42, multiplier 45, attenuators 47 and 48 are gathered at summation circuit 49 whose output, as shown in the drawing, is governed by Eq. (6). The delay time of delay circuit 42 should be adjusted to cancel out the second and third products of g(t). Then, the signal at output terminal is $m\hat{g}(t) + O(m^4)$ which indicates that a residual distortion level is very small when m < 1.

Figure 5:
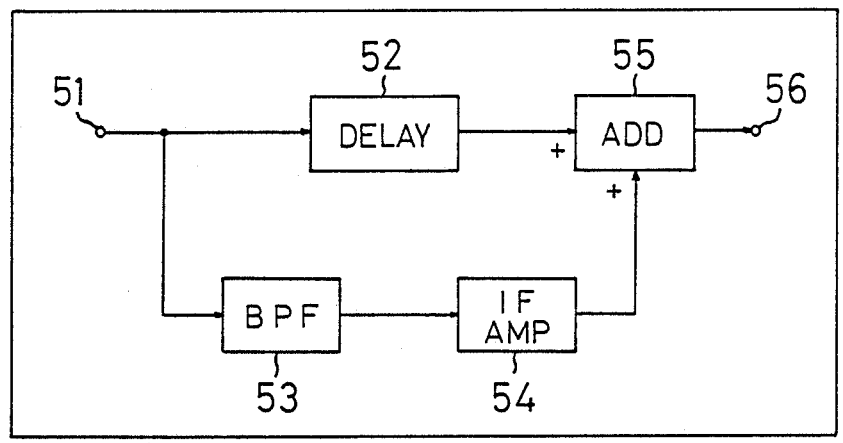
FIG. 5 is a block diagram of selective amplification circuit of carrier component.

FIG. 5 shows the modification of the present invention. In order to improve the transmission efficiency of transmitting signals, it is necessary to reduce the level of the carrier when compared with that of SSB signals. However, this signal cannot be directly applied to the amplitude limiter, because this signal is not a full-carrier SSB at all. Prior to the amplitude limiter, the selective amplification circuit of carrier component depicted in FIG. 5 is required to regenerate a full-carrier SSB signal from a receiving signal. The circuit depicted in FIG. 5 is inserted between IF amplifier 11 and amplitude limiter 12 as shown in FIG. 1. In FIG. 5, the reference numerical 51 is an input terminal, 52 is a delay circuit, 53 is a bandpass filter, 54 is an IF amplifier, 55 is an adder and 56 is an output terminal.

The signal at the input terminal 51, which is the output of IF amplifier 11, is fed to delay circuit 52 and bandpass filter 53. The carrier component whose frequency is converted to IF region is extracted by bandpass filter 53. The output of bandpass filter 53 is amplified in IF amplifier 54 up to a level to satisfy the condition of the full-carrier SSB signal. The signal at the output of IF amplifier 54 is combined with the output of delay circuit 52 at adder 55. Then, the signal at output terminal 56 can be safely input to amplitude limiter 12.

Figure 6:
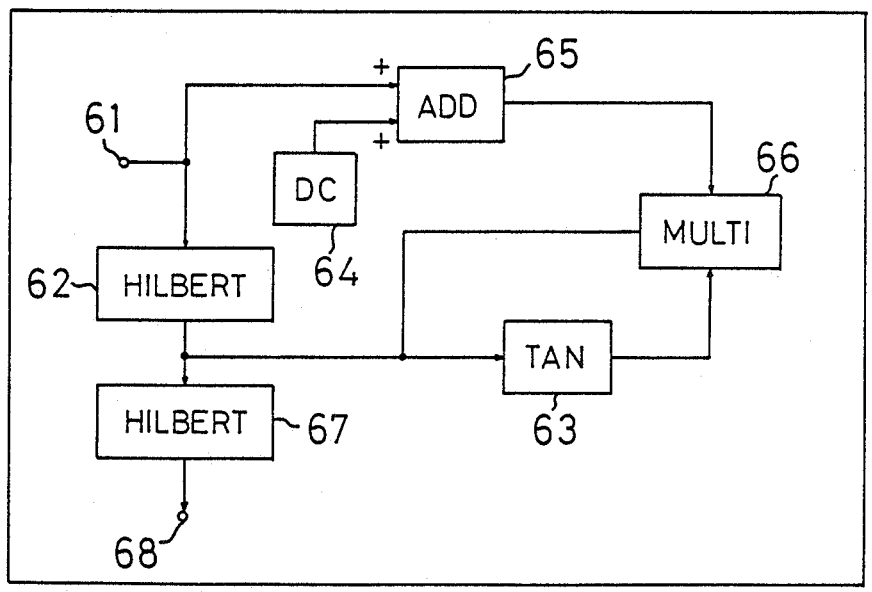
FIG. 6 is a block diagram of pre-distortion circuit introduced in a transmitter portion of the system.

FIG. 6 shows the modification of the present invention, where a modulating signal is pre-distorted in the transmitter portion of the system so that the linearizer circuit depicted in FIGS. 2, 3 or 4 is not necessary in the receiver portion of the system at all. When the following relation is satisfied, that is, $$\arctan\{m\hat{g}(t)/(1+mg(t))\} = m\hat{g}(t), \qquad (8)$$

the signal demodulated by the frequency detector and equalizer does not produce any distortions at all. The left hand side of Eq. (8) is the signal demodulated by the frequency detector and equalizer, and the right hand side of Eq. (8) is the Hilbert transform of original information signal sent by the transmitter. Equation (8) is easily rearranged as $$(1+mg(t))\tan(m\hat{g}(t)) = m\hat{g}(t), \qquad (9)$$

which is convenient for fabricating a pre-distortion circuit by using the extant devices. When g(t), which is pre-distorted in keeping with the relation of Eq. (9), is fed to SSB modulator 3, the detected signal is always corresponding to the original information signal even though it is Hilbert-transformed.

The pre-distortion circuit is inserted between signal source 1 and SSB modulator 3. In FIG. 6, the reference numerical 61 is an input terminal, 62 is a Hilbert transformer, 63 is a tangent function generator, 64 is a DC (direct current) source, 65 is an adder, 66 is a multiplier, 67 is a Hilbert transformer and 68 is an output terminal. The signal at input terminal 61, which is derived from signal source 1, is fed to Hilbert transformer 62 and adder 65. By the use of DC source 64, adder 65 makes the signal which is 1+mg(t). The output of Hilbert transformer 62 feeds both tangent function generator 63 and Hilbert transformer 67. The product of between the output of adder 65 and tangent function generator 63 is made by multiplier 66. The signal at the output of multiplier 66 is fed back to the input of tangent function generator 63. Then, the output of Hilbert transformer 67 is the signal pre-distorted and is led to output terminal 68.

The present invention may be combined with some of conventional communication techniques such as a syllabic compandor, a diversity reception system and/or a smearing filter, etc.

A syllabic compandor is available to suppress harmful noises such as a thermal noise, a man-made noise and/or a click noise. In a transmitter portion, a compressor is introduced between signal source 1 and SSB modulator 3 as shown in FIG. 1. The compressor (not shown) compresses the signal level which is lower than the reference level. Then, the dynamic range of between the highest and the lowest signal level is reduced. The signal compressed is fed to the SSB modulator and is transmitted. In a receiver portion, a expandor (not shown) is introduced between linearizer 15 and AF amplifier 16 so that the signal compressed is expanded. When noises are superimposed to the signal, in the expansion process, they are reduced. Then, an SNR (signal-to-noise ratio) is improved as compared with the case that the syllabic compandor is not introduced.

FIG. 7 shows the modification of the present invention. Diversity systems are the most promising scheme for elimination of the effects of fading. In FIG. 7, the reference numerals through 10 to 17 show the same members as those of the same numerals in FIG. 1, 9a and 9b are receiving antennas, 71 is an antenna switch, 72 is a switch logic circuit, 73 is a level detector. The instantaneous envelope of the signal received by receiving antenna 9a, for example, is monitored by level detector 73, if it falls below a predetermined threshold, antenna switch 71 is activated by switch logic circuit 72, thus selecting the second branch of 9b. If the second branch is above the threshold, switching ceases. If the second branch is also in a fade, we can either revert to the first branch. The amplitude fading extremely eliminated is derived from the output of antenna switch 71.

It should be appreciated that there are a lot of diversity techniques available, for instance, space diversity, frequency diversity, time diversity, etc. The diversity technique is still effective for introduction to a transmitter instead of a receiver.

Still another modification of the present invention is the use of smearing filter for improving an SNR of detected signal. The smearing and desmearing filters (not shown) are placed before the modulator and after the demodulator, respectively. These two filters thus operate on the information signal in this case and are usually chosen to be complementary so that in the ideal case, the net effect upon the information signal is merely a delay.

During severe fading, most of the amplitude information in conventional SSB signalling may be wiped out. In the present signalling, real zeros play in important role for conveying the information just like FM. Zeros of the signal possess great immunity to noise and interference. The pre-distortion circuit, a syllabic compandor, a diversity system, and/or a smearing filter are still useful to combat noises encountered in mobile radio transmission path.

As described above in detail, the present invention possesses the following particular effects and is definitely useful for use in mobile radio communication systems.

(a) As an SSB modulation method is employed, the necessary radio bandwidth is comparable to the information bandwidth.
(b) As an amplitude limiter is introduced in a receiver portion, degradations caused by fading and/or man-made noises encountered in mobile radio environments are removed.
(c) As a conventional SSB transmitter and PM receiver may be used merely by inserting a linearizer prior to an AF amplifier, there is no difficulty to manufacture a transceiver of the present invention.

From the foregoing, it will now be apparent that a new and improved SSB communication system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An SSB communication system comprising:
   a transmitter transmitting an SSB amplitude modulation signal composed of both a single sideband carrier suppressed signal and a carrier signal; and
   a receiver including
   (a) an amplitude limiter which removes amplitude variations of received SSB amplitude modulation signal,
   (b) a frequency detector connected to an output of said amplitude limiter to demodulate the SSB amplitude modulation signal,
   (c) an equalizer, which is composed of an integrator, connected to an output of said frequency detector to compensate a frequency response of a frequency-detected signal, and
   (d) a linearizer connected to an output of said equalizer to cancel out distortions contained in the demodulated signal, said linearizer comprises a Hilbert transformer providing a Hilbert transform of an input signal from said frequency detector, a multiplier providing a product of said Hilbert transformer output and the input signal, and a subtractor subtracting a second order product, derived from said multiplier, from the input signal.

2. An SSB communication system according to claim 1, wherein prior to said amplitude limiter in the receiver, a selective amplifier is connected in order to selectively amplify a carrier component where a level of the carrier is greater than that of the SSB amplitude modulation signal, said selective amplifier comprises:
   a bandpass filter exclusively extracting the carrier component,
   a amplifier amplifying an output of said bandpass filter,
   a delay circuit compensating a delay time generated from both said bandpass filter and amplifier, and
   an adder summing up outputs of said amplifier and delay circuit.

3. An SSB communication system comprising:
   a transmitter transmitting an SSB amplitude modulation signal composed of both a single sideband carrier suppressed signal and a carrier signal; and
   a receiver including (a) an amplitude limiter which removes amplitude variations of received SSB amplitude modulation signal, (b) a frequency detector connected to an output of said amplitude limiter to demodulate the SSB amplitude modulation signal, (c) an equalizer, which is a −6 dB/octave response equalizer, connected to an output of said frequency detector to compensate a frequency response of a frequency-detected signal, and (d) a linearizer connected to an output of said equalizer to cancel out distortions contained in the demodulated signal, said linearizer comprising a Hilbert transformer providng a Hilbert transform of an input signal from said frequency detector, an adder and a subtractor providing a sum and difference between the input signal and the output of said Hilbert transformer, respectively, a multiplier providing a product of said adder and subtractor, an attenuator halving the output of said multiplier and adder providing the sum of the output of said attenuator and the input signal.

4. An SSB communication system according to claim 3, wherein prior to said amplitude limiter in the receiver, a selective amplifier is connected in order to selectively amplify a carrier component where a level of the carrier is greater than that of the SSB amplitude modulation signal, the said selective amplifier comprises:

a bandpass filter exclusively extracting the carrier component, an amplifier amplifying an output of said bandpass filter, a delay circuit compensating a delay time generated from both said bandpass filter and amplifier, and an adder summing up outputs of said amplifier and delay circuit.

5. An SSB communication system comprising:

a transmitter transmitting an SSB amplitude modulation signal composed of both a single sideband carrier suppressed signal and a carrier signal; and a receiver including (a) an amplitude limiter which removes amplitude variation of received SSB amplitude modulation signal, (b) a frequency detector connected to an output of said amplitude limiter to demodulate the SSB amplitude modulation signal, (c) an equalizer, which is composed of an integrator, connected to an output of said frequency detector to compensate a frequency response of a frequency-detected signal, and (d) a linearizer connected to an output of said equalizer to cancel out distortions contained in the demodulated signal, said linearized comprising a Hilbert transformer providing a Hilbert transform of an input signal, a first multiplier providing a product of the output of said Hilbert transfer and the input signal, a cuber providing a cube of the input signal, a second multiplier providing a product of the outputs of said Hilbert transformer and the first multiplier, a first attenuator attenuating the output of the cuber with an attenuation factor of 1/6, a second attenuator attenuating an output of said multiplier with an attenuation factor of ½, and a summation circuit summing up the input signal, outputs of said first multiplier, and said first and second attentuators.

6. An SSB communication system according to claim 5, wherein prior to said amplitude limiter in the receiver, a selective amplifier is connected in order to selectively amplify a carrier component where a level of the carrier is greater than that of the SSB amplitude modulation signal, said selective amplifier comprises:

a bandpass filter exclusively extracting the carrier component, an amplifier amplifying an output of said bandpass filter, a delay circuit compensating a delay time generated from both said bandpass filter and amplifier, and an adder summing up outputs of said amplifier and delay circuit.

7. An SSB communication system according to claim 5, wherein a diversity communication system is installed into at least one of said transmitter and said receiver.

8. An SSB communication system according to claim 5, wherein a syllabic compandor is installed into a transceiver of said SSB communication system, a compressor for said transmitter and an expandor for said receiver.

9. An SSB communication system according to claim 5, wherein a smearing filter is installed into a transceiver of said SSB communication system, a smearing filter for said transmitter and a desmearing filter for said receiver.

* * * * *